Oct. 13, 1931.  H. F. DAVIS  1,826,746
FLYTRAP
Filed May 20, 1929  2 Sheets-Sheet 2
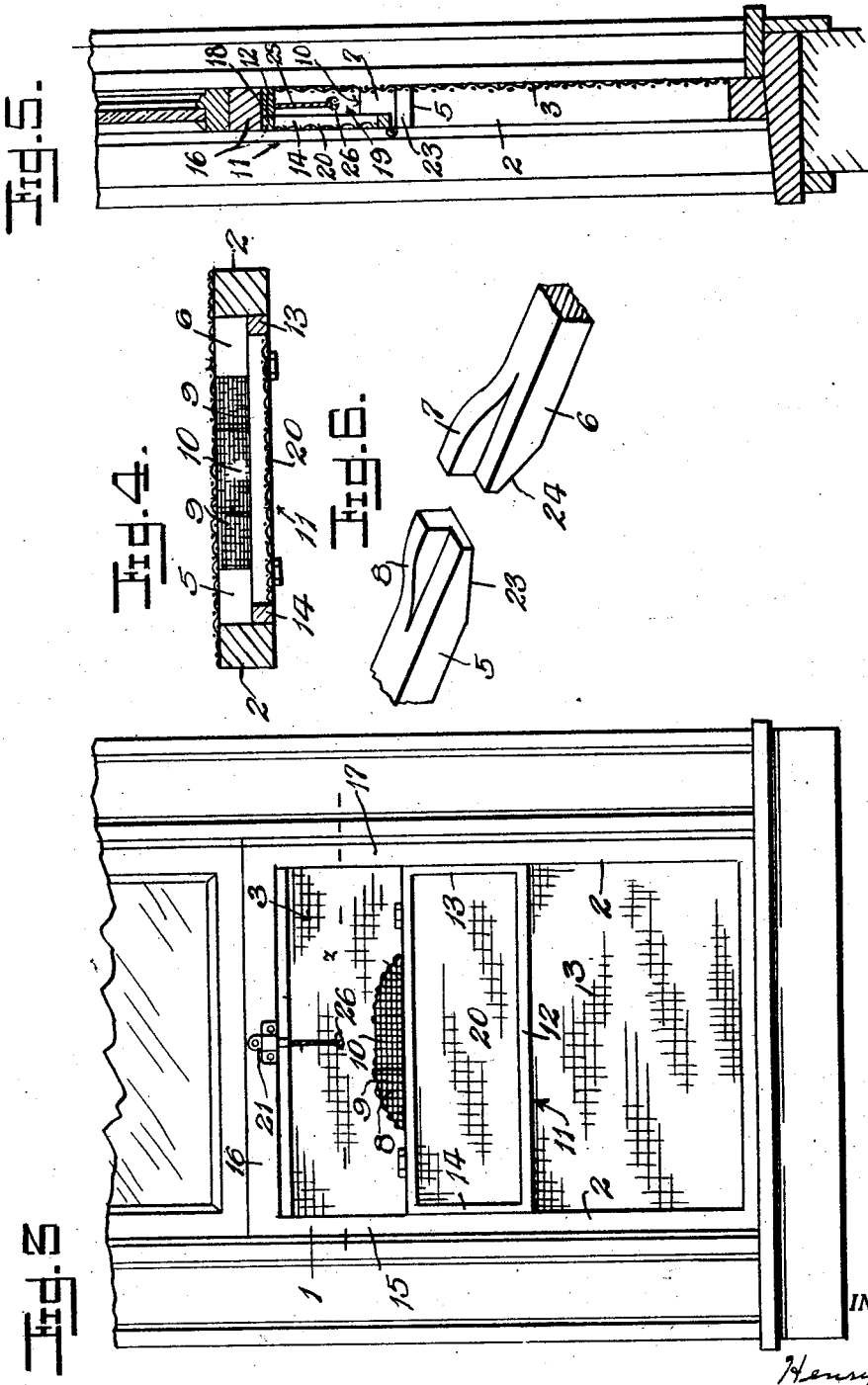
INVENTOR.
Henry F. Davis Patented Oct. 13, 1931

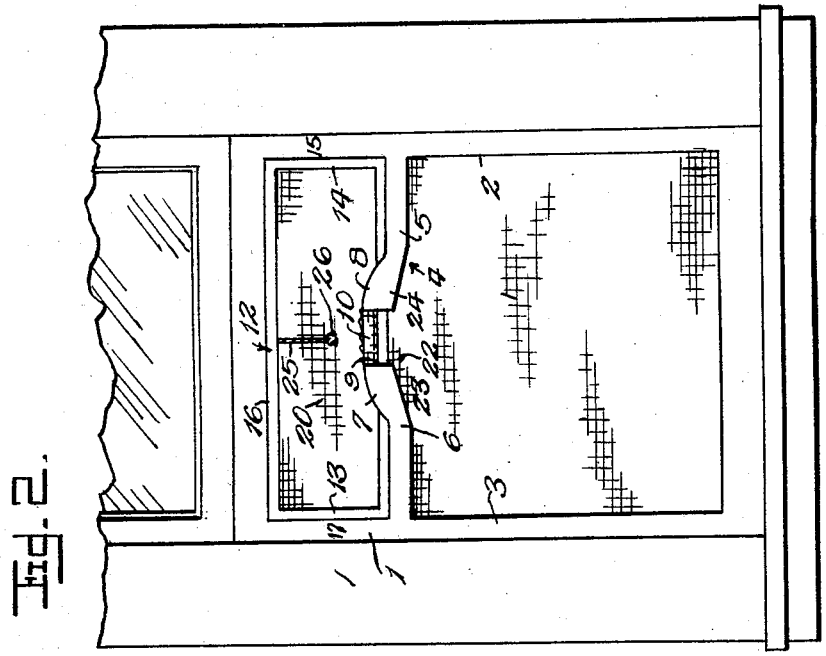
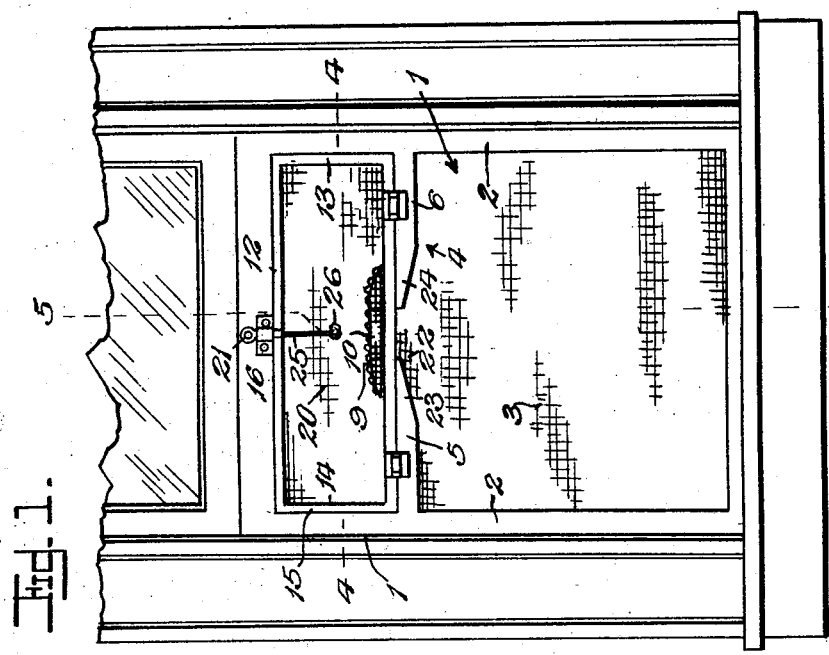

1,826,746

UNITED STATES PATENT OFFICE

HENRY F. DAVIS, OF WALTERS, OKLAHOMA

FLYTRAP

Application filed May 20, 1929. Serial No. 364,588.

This invention relates to improvements in fly screens and has for its object to provide a combination of such a screen and a fly trap.

With the above and such other objects in view as may hereinafter more fully appear, I have invented the device shown in the accompanying drawings in which:

Figure 1 is an elevational view of a fly screen made according to my invention;

Figure 2 is a similar view taken from the reverse side.

Figure 3 is a view similar to Figure 1 with the trap door shown open;

Figure 4 is a transverse section on the line 4—4 of Figure 1;

Figure 5 is a vertical section on the line 5—5 of Figure 1;

Figure 6 is a perspective view, enlarged, of the confronting ends of the two part transverse bar;

Like reference characters indicate like parts throughout the following specification and in the several views in the drawings, in which 1 indicates a fly screen, comprising a frame 2, having a wire netting covering 3, on one side thereof, and a cross member 4 comprising opposing bars 5 and 6 having spaced apart enlargements 7 and 8 which enlargements are bridged by a piece of wire netting 9, having a central opening 10. Hingedly connected to the members 5 and 6 is a screen door 11, the edges 12, 13 and 14 of which seat flush with the frame parts 15, 16 and 17, the edge bar 12 of the door 11 seating against the spacer 18, whereby a trap 19 is formed between the netting 3 of the frame 2 and the netting 20 of the door 11. A bolt 21 is attached to the frame member 16, and overlaps the member 12, whereby the door 11 is held closed. Flies going up the portion 22 of the screen will be directed by the beveled terminals 23 and 24 of the members 5 and 6 to the opening 10 in the member 9 into the trap 19. A bait string 25 is suspended from the frame 16 whereby bait 26 will be held adjacent the opening 10 to induce the flies to enter.

Having described my invention, that which I claim to be new and desire to procure by Letters Patent is:

A device of the character described comprising a frame, of substantially the size of a window sash, a pair of inwardly projecting frame members, a screen covering the outer side of said frame members, said members having lugs extending up from their opposing spaced apart ends, a screen door substantially the width of said screen hinged to said members and being spaced apart from the first screen by said lugs.

In testimony whereof I affix my signature.

HENRY F. DAVIS.